United States Patent
Zhang et al.

(10) Patent No.: US 8,825,056 B2
(45) Date of Patent: Sep. 2, 2014

(54) METHOD TO SELECT MS IN OVERLOAD CONTROL TRIGGERED BASE STATION INITIATED HANDOVER IN WIMAX SYSTEMS

(75) Inventors: Wei Zhang, San Diego, CA (US); Tom Chin, San Diego, CA (US); Kuo-Chun Lee, San Diego, CA (US); Guangming Shi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 215 days.

(21) Appl. No.: 13/252,593

(22) Filed: Oct. 4, 2011

(65) Prior Publication Data
US 2013/0084863 A1    Apr. 4, 2013

(51) Int. Cl.
*H04W 36/00* (2009.01)

(52) U.S. Cl.
USPC ........... 455/438; 455/439; 455/440; 455/442; 455/453; 455/434; 370/331

(58) Field of Classification Search
USPC ........... 455/436–442, 453, 434, 67.11–67.16, 455/423–425; 370/331
See application file for complete search history.

(56) References Cited

U.S. PATENT DOCUMENTS

| | | | |
|---|---|---|---|
| 5,428,816 A * | 6/1995 | Barnett et al. | 455/437 |
| 5,548,812 A * | 8/1996 | Padovani et al. | 455/442 |
| 5,778,316 A * | 7/1998 | Persson et al. | 455/434 |
| 7,330,727 B2 * | 2/2008 | Korneluk et al. | 455/438 |
| 7,336,953 B2 | 2/2008 | Kim et al. | |
| 7,369,856 B2 | 5/2008 | Ovadia | |
| 7,668,504 B2 | 2/2010 | Kang et al. | |
| 7,813,734 B2 | 10/2010 | Kang et al. | |
| 8,270,980 B2 * | 9/2012 | Forssell | 455/439 |
| 8,331,319 B2 * | 12/2012 | Tailor et al. | 370/331 |
| 8,385,261 B2 * | 2/2013 | Lee et al. | 370/328 |
| 2004/0176094 A1 * | 9/2004 | Kim et al. | 455/438 |
| 2007/0010251 A1 * | 1/2007 | Cho et al. | 455/436 |
| 2008/0299973 A1 * | 12/2008 | Sayeedi | 455/436 |
| 2009/0163223 A1 | 6/2009 | Casey | |
| 2009/0310559 A1 | 12/2009 | Chen et al. | |
| 2010/0003986 A1 | 1/2010 | Chen | |
| 2010/0118705 A1 * | 5/2010 | Mehrotra et al. | 370/237 |
| 2010/0202411 A1 | 8/2010 | Mo et al. | |
| 2010/0208700 A1 * | 8/2010 | Shi et al. | 370/331 |
| 2010/0246433 A1 | 9/2010 | Kim et al. | |
| 2011/0256870 A1 * | 10/2011 | Park et al. | 455/436 |
| 2012/0276945 A1 * | 11/2012 | Chindapol et al. | 455/525 |

FOREIGN PATENT DOCUMENTS

| | | |
|---|---|---|
| EP | 1758423 A1 | 2/2007 |
| EP | 2031922 A2 | 3/2009 |
| WO | 2009071987 A1 | 6/2009 |

OTHER PUBLICATIONS

International Search Report and Written Opinion—PCT/US2012/058653—ISA/EPO—Feb. 21, 2013.

* cited by examiner

*Primary Examiner* — Sharad Rampuria
(74) *Attorney, Agent, or Firm* — Tyler J. Overall

(57) ABSTRACT

Certain aspects of the present disclosure provide methods and apparatus that may help alleviate load conditions by taking action to select one or more mobile stations (MSs) for handover to a neighbor base station are provided.

20 Claims, 10 Drawing Sheets

METHOD TO SELECT MS IN OVERLOAD CONTROL TRIGGERED BASE STATION INITIATED HANDOVER IN WIMAX SYSTEMS

TECHNICAL FIELD

Certain aspects of the present disclosure generally relate to wireless communication and, more particularly, to a method for selecting MSs for handover in response to an overload condition.

BACKGROUND

In wireless communications systems, mobile stations (MSs) may handover from one base station (BS) to another to maintain coverage. Handover may be initiated by an MS, for example, in response to detecting a stronger signal from a neighbor BS relative to a current serving BS.

A BS may also initiate a handover. One scenario for a BS (Base Station) initiated handover is when a BS is a loaded (or overloaded) state, for example, serving many MSs. Initiating a handover by the BS may allow some MSs to perform handover to one or more neighbor BSs, which may help relieve an overload condition.

Unfortunately, it is not always clear which MSs the BS should select for handover to achieve the best system performance.

SUMMARY

Certain aspects of the present disclosure generally relate to techniques for selecting mobile stations (MSs) for handover in an intelligent manner to alleviate loading conditions.

Certain aspects of the present disclosure provide a method for wireless communications. The method generally includes selecting one or more candidate mobile stations (MSs) that are candidates for handover, sending unsolicited scan response messages to the candidate MSs, and selecting one or more of the candidate MSs for handing over to one of the neighbor base station, based on information about neighbor base stations received in scan reports sent in response to the scan response messages.

Certain aspects of the present disclosure provide a method for wireless communications. The method generally includes determining loading of a serving base station and adjusting one or more trigger values indicative of when one or more mobile stations (MSs) should perform at least one of scanning or handing over to a neighbor base station.

Certain aspects of the present disclosure provide an apparatus for wireless communications. The apparatus generally includes means for selecting one or more candidate mobile stations (MSs) that are candidates for handover, means for sending unsolicited scan response messages to the candidate MSs, and means for selecting one or more of the candidate MSs for handing over to one of the neighbor base station, based on information about neighbor base stations received in scan reports sent in response to the scan response messages.

Certain aspects of the present disclosure provide an apparatus for wireless communications. The apparatus generally includes means for determining loading of a serving base station and means for adjusting one or more trigger values indicative of when one or more mobile stations (MSs) should perform at least one of scanning or handing over to a neighbor base station.

Certain aspects of the present disclosure provide an apparatus for wireless communications. The apparatus generally includes at least one processor configured to select one or more candidate mobile stations (MSs) that are candidates for handover, send unsolicited scan response messages to the candidate MSs, and select one or more of the candidate MSs for handing over to one of the neighbor base station, based on information about neighbor base stations received in scan reports sent in response to the scan response messages; and a memory coupled with the at least one processor.

Certain aspects of the present disclosure provide an apparatus for wireless communications. The apparatus generally includes at least one processor configured to determine loading of a serving base station and adjust one or more trigger values indicative of when one or more mobile stations (MSs) should perform at least one of scanning or handing over to a neighbor base station; and a memory coupled with the at least one processor.

Certain aspects of the present disclosure provide a computer program product comprising a computer readable medium having instructions stored thereon. The instructions are generally executable by one or more processors for selecting one or more candidate mobile stations (MSs) that are candidates for handover, sending unsolicited scan response messages to the candidate MSs, and selecting one or more of the candidate MSs for handing over to one of the neighbor base station, based on information about neighbor base stations received in scan reports sent in response to the scan response messages.

Certain aspects of the present disclosure provide a computer program product comprising a computer readable medium having instructions stored thereon. The instructions are generally executable by one or more processors for determining loading of a serving base station and adjusting one or more trigger values indicative of when one or more mobile stations (MSs) should perform at least one of scanning or handing over to a neighbor base station.

BRIEF DESCRIPTION OF THE DRAWINGS

So that the manner in which the above-recited features of the present disclosure may be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
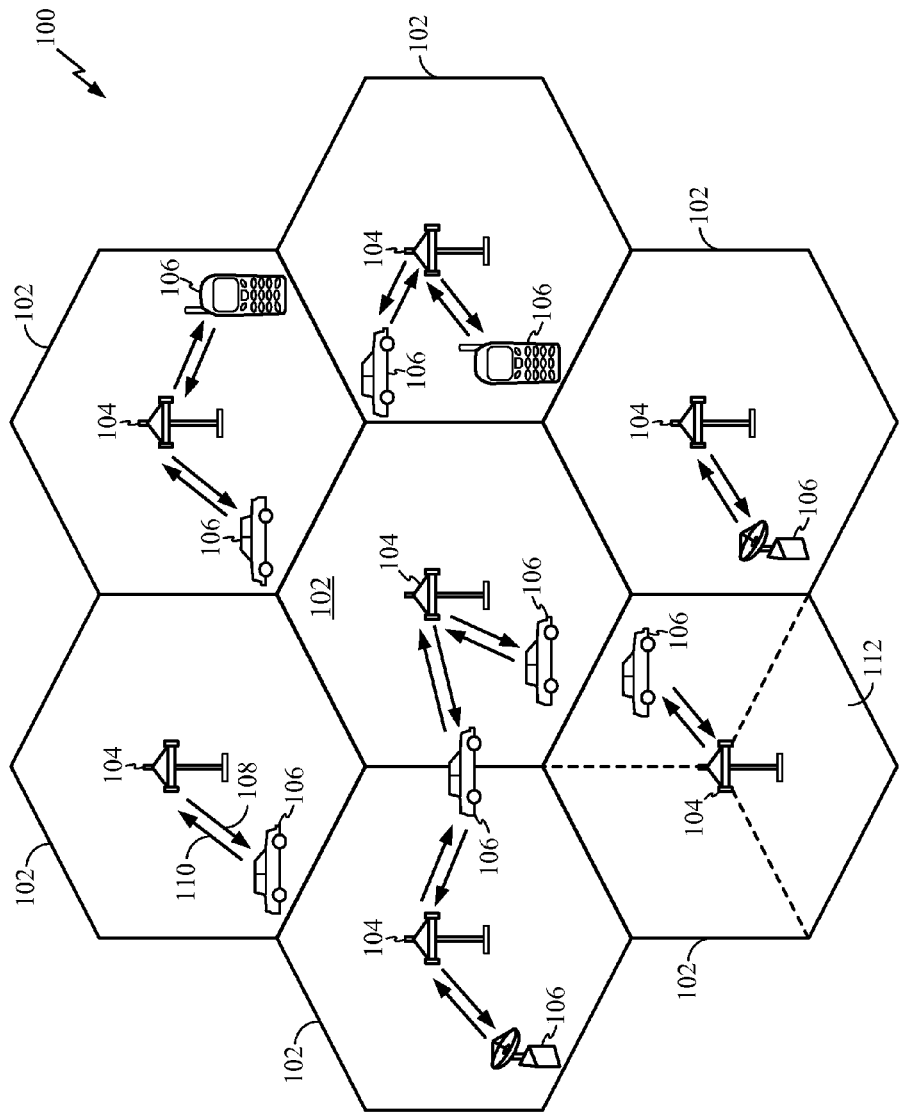
FIG. 1 illustrates an example wireless communication system, in accordance with certain aspects of the present disclosure.

Certain aspects of the present disclosure provide techniques for the selection of Mobile Stations (MSs) for handover, for example, in response to an overload condition at a base station (BS). The techniques presented herein may be used to identify MSs that are in proximity to a neighbor BS (that is the target of a handover), which may help ensure the MS has sufficient quality of service from the neighbor BS, after handover, as it had from the serving BS.

According to certain aspects, CINR values from Mobile Stations may be used to select candidates for Handover. When a serving BS is loaded, it may send Unsolicited Scan Response messages to the candidate MSs and Scan Reports received in response may be used to select MSs for handover, using various algorithms.

According to certain aspects, the amount of loading on a serving base station may be first calculated in order to determine values of Scan and Handover Trigger Thresholds. There are different ways to measure the loading of the base station, for example, based on rise over thermal (RoT) that represents a ratio between the total power in the reverse link and the thermal noise power seen at the BS. In any case, these Trigger Threshold values sent to MSs, for example as Type Limited Variables (TLVs), may trigger one or more MSs to scan neighbor BSs and the corresponding Scan Reports may be used to select MSs for handover, using various techniques.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth.

An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

An OFDMA network may implement a radio technology such as Evolved UTRA (E-UTRA), The Institute of Electrical and Electronics Engineers (IEEE) 802.11, IEEE 802.16, IEEE 802.20, Flash-OFDM, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Another example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 Oct. 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
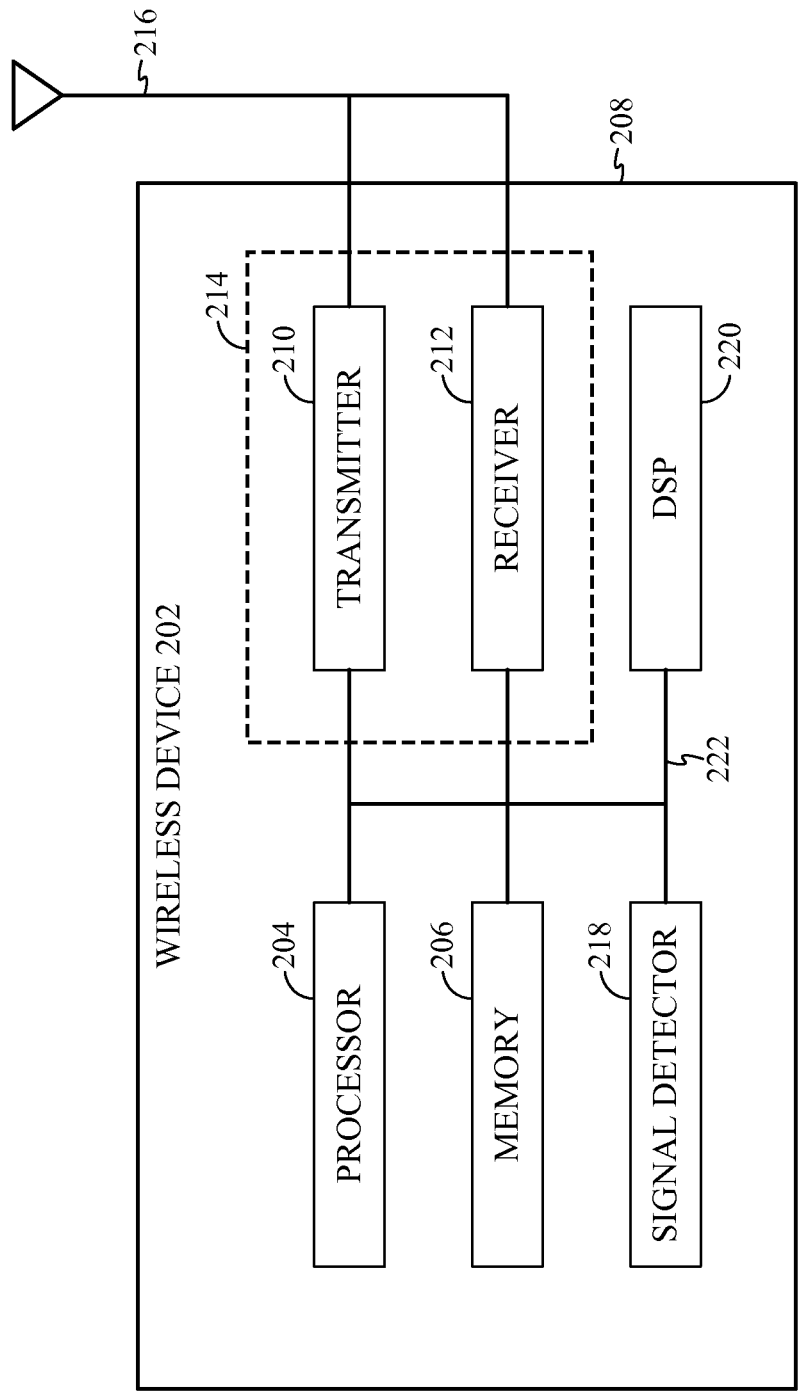
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
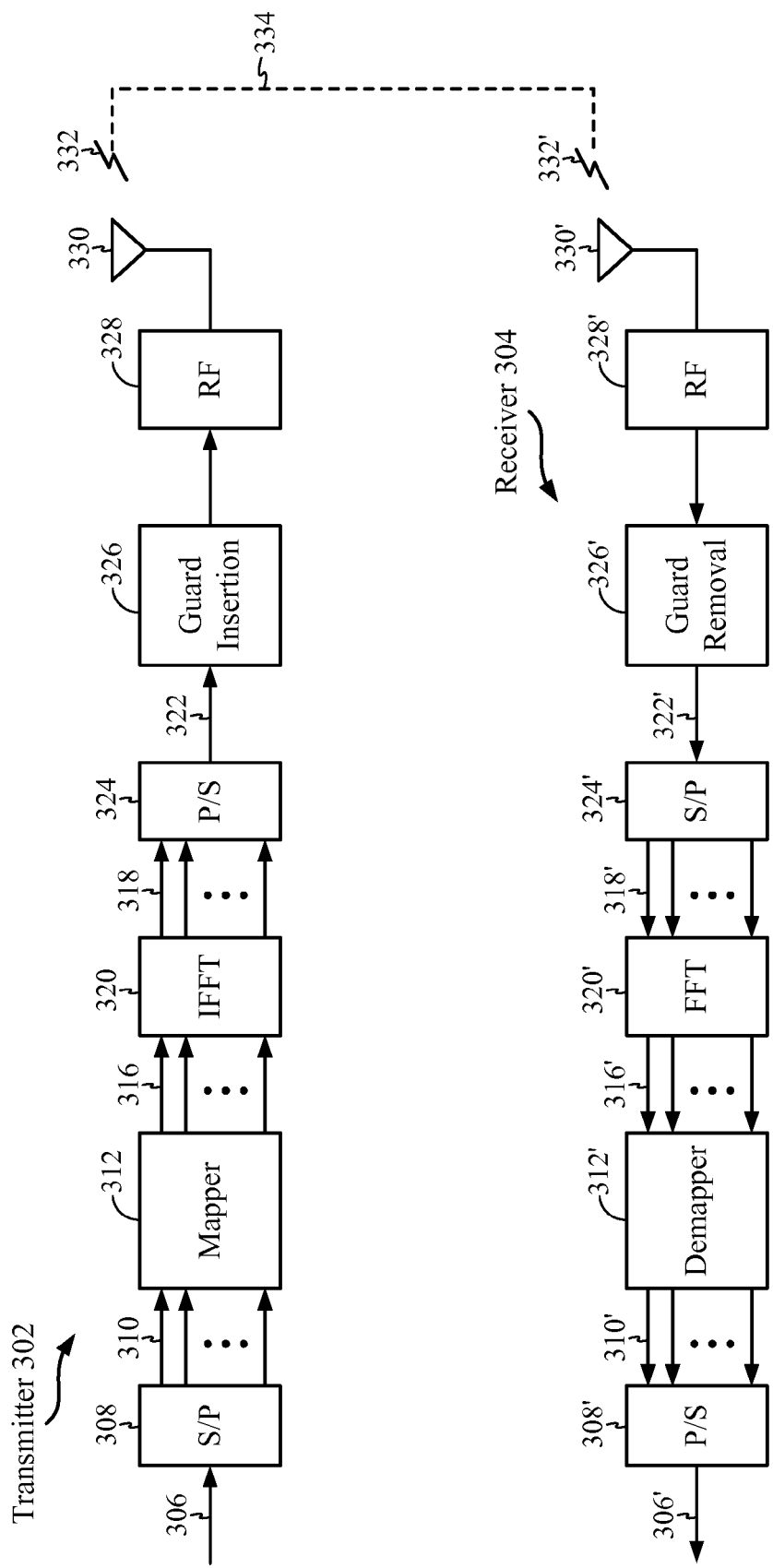
FIG. 3 illustrates an example transmitter and an example receiver that may be operated in accordance with certain aspects of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Method to Select Ms in Overload Control Triggered Bs Initiated Handover in Wimax Systems As previously described, certain aspects of the present disclosure provide techniques that may be used to select MSs for handover when a serving BS is overloaded, while providing some level of assurance that the MSs selected for handover will have sufficient quality of service, after handover, as they had from the (previously) serving BS.

Figure 4:
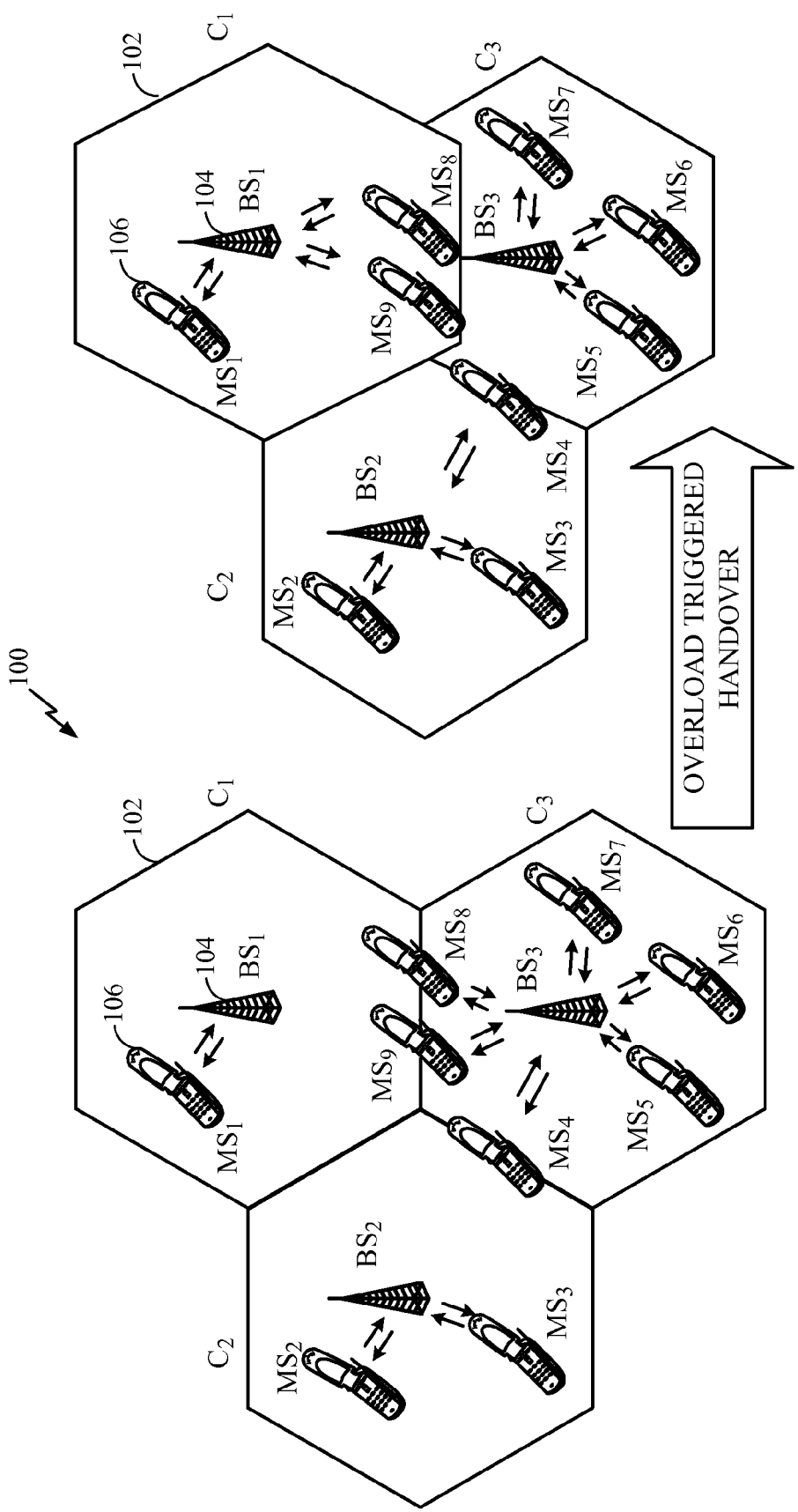
FIG. 4 illustrates the effects of handover of Mobile Stations (MSs), in accordance with certain aspects of the present disclosure.

FIG. 4 illustrates how a base station may become overloaded and how certain aspects of the present disclosure may help relieve an overloaded condition by triggering one or more MSs to hand over to a neighbor base station.

In the example shown on the left hand side of FIG. 4, base station $BS_3$ is overloaded, in the illustrated example, serving six MSs ($MS_4$-$MS_9$), while $BS_1$ serves only $MS_1$, and $BS_2$ serves only $MS_2$ and $MS_3$. As illustrated on the right hand side of FIG. 4, by performing BS-initiated handover procedures, $BS_3$ may be able to relieve the overloaded condition, in this example, causing $MS_4$ to hand over to $BS_2$ and $MS_8$ and $MS_9$ to hand over to $BS_1$.

As illustrated in FIG. 4, triggering one or more MSs to hand over effectively shrinks the coverage area $C_3$ of $BS_3$. As will be described in greater detail below, the effective coverage area may be reduced by manipulating signal to noise ratio (SNR) trigger values that trigger an MSs to start scanning for neighbor BSs sooner. As will be described herein, a BS may manipulate such trigger values upon experiencing loading conditions.

According to certain aspects, a BS may utilize a periodic channel quality indicator channel (CQICH) report to check whether or not candidate MSs are in close proximity to the neighbor BSs that are potential targets for handover. Typically, when MS is in proximity to a neighbor BS, corresponding CINR indicated in the report will be relatively low. The techniques presented herein may also utilize QoS parameters to select MSs to handover to effectively reduce loading.

Figure 5:
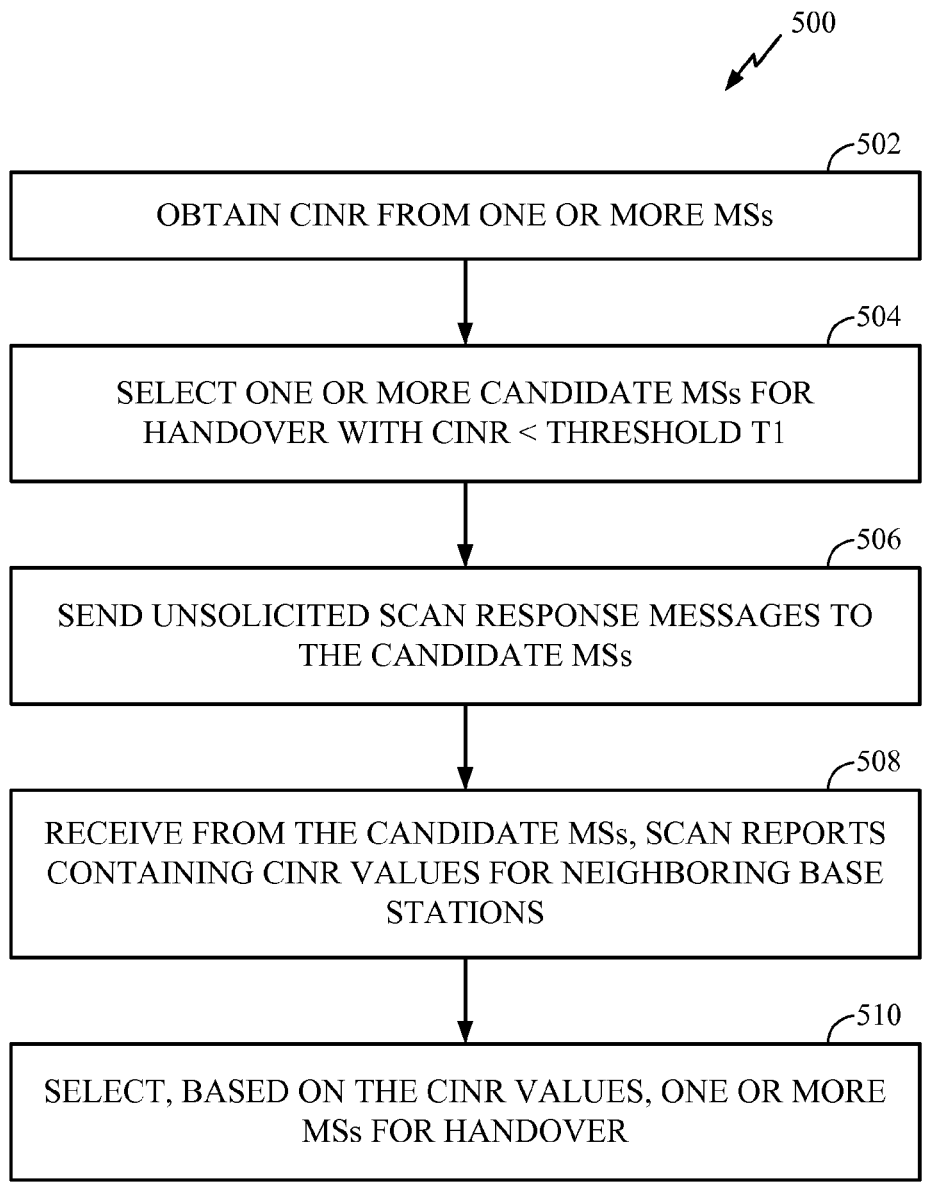
FIG. 5 illustrates example operations for selecting one or more MSs for handover in accordance with certain aspects of the present disclosure.

FIG. 5 illustrates example operations 500 for selecting one or more MSs for handover in accordance with certain aspects of the present disclosure. The operations may be performed, for example, by a serving BS such as those illustrated in FIG. 4.

The operations 500 begin, at 502, with the BS obtaining CINR values from one or more MSs. According to certain aspects, CINR values may be obtained via a fast feedback channel.

At 504, the BS may select one or more candidate MSs for handover, based on a comparison of the CINR values and threshold value $T_1$. For example, the BS may select, as candidates, MSs with CINR values less than $T_1$. The particular value utilized for $T_1$ may depend on various factors. For example, $T_1$ may be determined based on a current loading on the BS, with $T_1$ generally being increased as load on the BS increases (thereby increasing the number of candidates).

At 506, the BS may send an Unsolicited Scan Response messages to the candidate MSs, thereby prompting the candidate MSs to scan for neighboring BSs. At 508, the BS may receive scan reports from the candidate MSs containing CINR values for the neighboring base stations.

At 510, the BS may select one or more of the candidate MSs for actual handover, based on the CINR values. The selection may be performed using various techniques. For example, according to certain aspects, the BS may calculate a difference between the CINR of a neighbor BS ($CINR_{neigbor}$) and its own CINR ($CINR_{serving}$) and compare this difference to a threshold value, $T_2$, and check for following condition:

$$CINR_{NEIGHBOR} - CINR_{SERVING} > T_2 \quad [1]$$

An MS that reported a CINR value meeting this condition may be selected for handover to the corresponding neighbor BS.

As with threshold $T_1$, the particular value utilized for Threshold $T_2$ may depend on various factors. For example, $T_2$ may be determined based on a current load on the BS. Accordingly, $T_2$ may be positive, zero or even slightly negative. A negative $T_2$ may mean CINR of the neighbor BS is lower than that of the serving BS. In some cases of severe overloading that may result in serious loss of service, MSs may be handed over to the neighbor BS even if CINR of the neighbor BS is lower than that of the serving BS. The handover may be performed, for example, if it is determined that the new serving BS may serve the MSs satisfactorily, despite having a lower CINR.

To summarize the operations described above, MSs that satisfy condition [1] may form a set A of MSs that are good candidates for handover. To decrease loading, one or more MSs of this candidate set A may be selected for actual handover. Selection from the candidate set may vary. According to certain aspects, MSs from set A may be selected randomly until loading conditions have improved sufficiently (e.g., below an acceptable threshold level).

According to certain aspects, rather than randomly selecting MSs in set A, the BS may select MSs for actual handover according to a defined algorithm. For example, the BS may sort the MSs (in candidate set A) in a descending order with a metric $m_1(N)$ of a given mobile station, $MS_N$. For example, the metric may be such that the higher the metric, the better chances the handover may have for success. According to certain aspects, the metric, $m_1(N)$ may be defined as:

$$m_1(N) = CINR_{BEST} - CINR_{SERVING} \quad [2]$$

where $CINR_{BEST}$ is the CINR of the neighbor BS with the best CINR.

According to certain aspects, MSs may be chosen from a descending order with a different metric $m_2(N)$ that considers a contribution to loading by each MS. For example, $m_2(N)$, may be defined as:

$$m_2(N) = R_{DL}(N) - R_{UL}(N) \quad [3]$$

where $R_{DL}(N)$ and $R_{UL}(N)$ are Maximum Sustained Traffic Rates of all Downlink and Uplink transport connections, respectively, of a particular Mobile Station $MS_N$. In this case, a high metric $m_2(N)$ may correspond to a greater reduction in loading at the serving BS, after handover. Thus, MSs may be chosen based on their impact on loading if handed over.

Of course other metrics may also be considered. Further, according to certain aspects, a combination of the above-mentioned metrics may be considered when selecting MSs to handover. For example, an algorithm may apply some type of weighting to the two metrics discussed above and make a decision based on a weighted sum.

Figure 6:
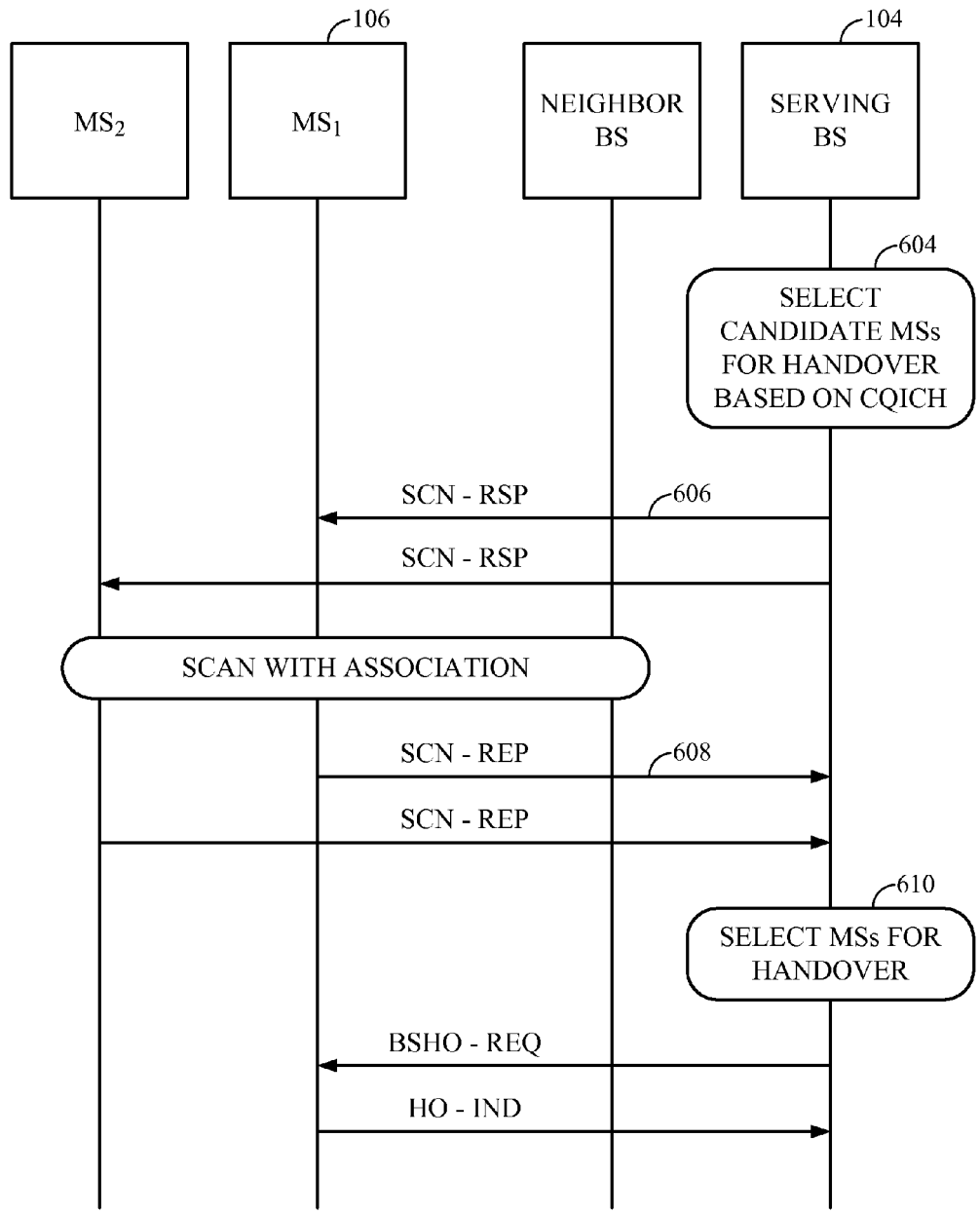
FIG. 6 illustrates an example exchange of messages corresponding to the operations illustrated in FIG. 5.

FIG. 6 illustrates example exchange of messages corresponding to the operations illustrated in FIG. 5.

At 604, the serving BS may select MSs with CINR values less than a predetermined threshold, as candidates for handover. As described above, the CINR values may be obtained based on CQICH reports from $MS_1$ and $MS_2$.

At 606, the serving BS may send Unsolicited Scan Response messages (SCN-RSP) to the MSs selected as candidates (both $MS_1$ and $MS_2$ in the illustrated example). In response, the MSs may scan neighbor BSs and send Scan Reports (SCN-REP), at 608, indicating CINR values corresponding to neighbor BS.

In the illustrated example, the serving BS selects $MS_1$ for handover (e.g., based on CINR values in the scan reports), using any of various suitable techniques as described earlier. Following the selection, the serving BS may send a Base Station Handover Request (BSHO-REQ) to $MS_1$ instructing $MS_1$ to handover to the neighbor BS. As indicated, $MS_1$ may respond by sending a Handover Indication (HO-IND).

According to certain aspects, a BS may manipulate parameters that trigger a MS to scan neighboring BSs. As noted above, this may effectively shrink the coverage area of a given BS by prompting handovers sooner than they would otherwise occur (if the trigger parameters were not so manipulated).

As an example, a BS may lower threshold values defined in a Neighbor BS trigger type limited variable (TLV) for a scan request (SCN-REQ) from $T_S$ and $T_H$ to second values $T_S'$ and $T_H'$. As another example, a BS may raise $T_S$ to $T_S''$ and lower $T_H$ to $T_H''$, as appropriate. The new threshold values may be determined based on the loading of the BS. As noted above, loading may be measured in different ways, for example, based on RoT.

Figure 7:
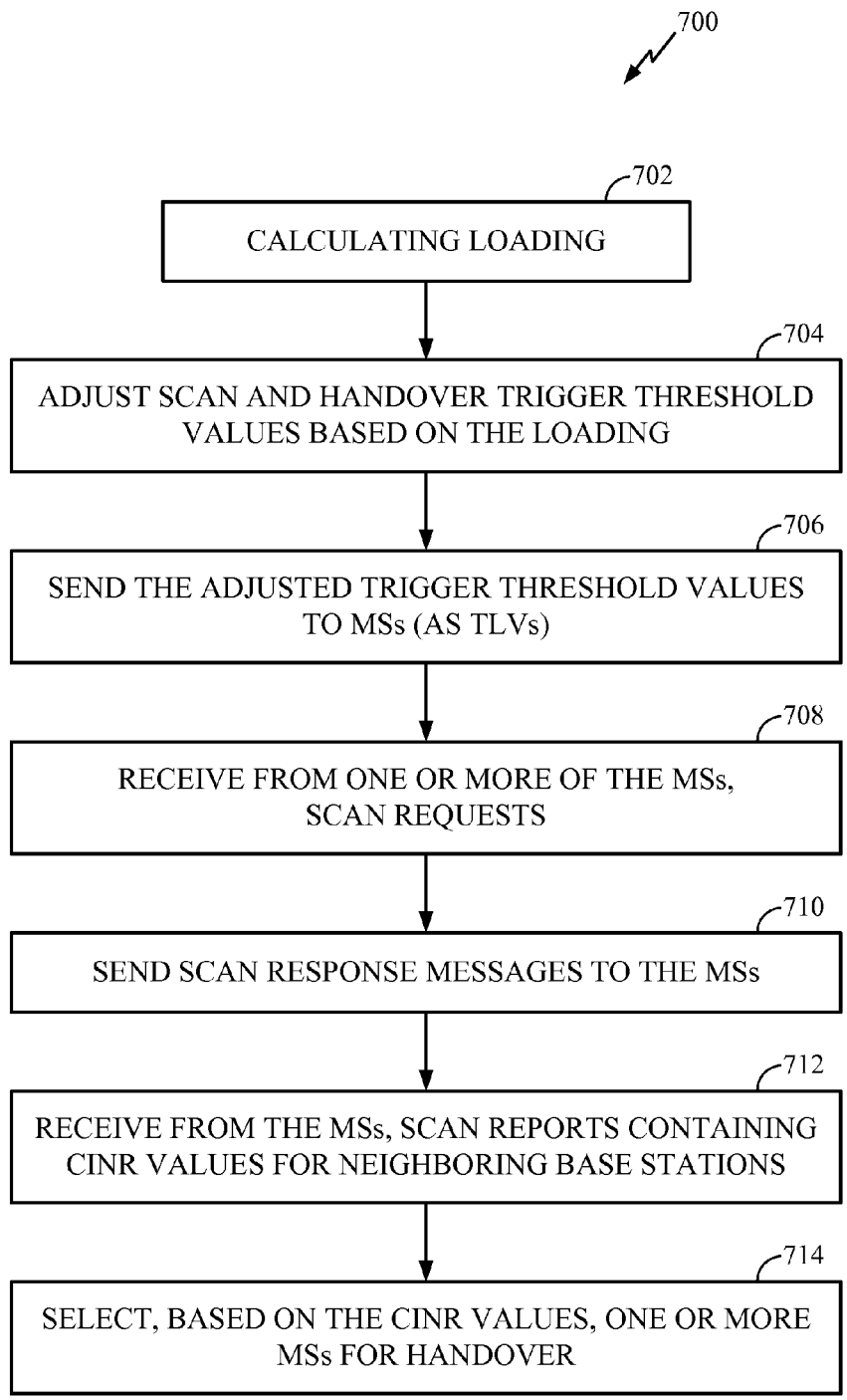
FIG. 7 illustrates example operations for selecting one or more MSs for handover in accordance with certain aspects of the present disclosure.

FIG. 7 illustrates example operations 700 for selecting one or more MSs for handover in accordance with certain aspects of the present disclosure. The operations may be performed, for example, by a serving B, such as those shown in FIG. 4.

The operations begin, at 702, with the BS calculating a loading parameter. At 704, the BS may adjust one or more Scan and Handover Trigger Threshold values, based on the calculated loading parameter. For example, the RoT at the BS may be measured and compared to a predetermined value. The trigger values may be adjusted up or down, depending on whether the RoT exceeds the predetermined value.

In some cases, to avoid an MS from being handed right back over to a serving base station, shortly after handover to a neighbor, a serving base station may perform some type of negotiation with neighbor BSs. In other words, if a Neighbor BS has already adjusted its trigger values, a serving BS may be limited in how much it may adjust its own.

In any case, at 706, the BS may send the adjusted Trigger Threshold values to MSs. For example, the adjusted trigger values may be sent as TLVs in a Downlink Channel Descriptor message (DCD) or a Neighbor Advertisement message (MOB_NBR-ADV). Such messages may also contain instructions for MSs on how they may use the trigger values.

On receiving a Scan Trigger Threshold value, a MS may, for example, compare this threshold value against a measured CINR value of the serving base station and issue a Scan Request, if the measured value is lower than the Scan Trigger Threshold value.

At 708, the BS may receive scan requests from one or more MSs. These scan requests may have been triggered by the Trigger Threshold values transmitted previously. At 710, the BS may respond to the scan requests by sending Scan Response Messages to the MSs. These Scan Response Messages may instruct the MSs to scan neighbor BSs and send reports of the scan to the BS. The Scan Response Messages may also contain scan duration.

At 712, the BS may receive scan reports containing CINR values for neighbor BSs. At 714, the BS may select MSs for handover, based on the scan reports using any of various suitable techniques, such as those discussed above. For example, a BS may generate a candidate set of MSs, based on the reported CINR values, and select MSs for handover randomly or based on one or more metrics (e.g., indicative of their effect on loading or likelihood of successful handover).

Figure 8:
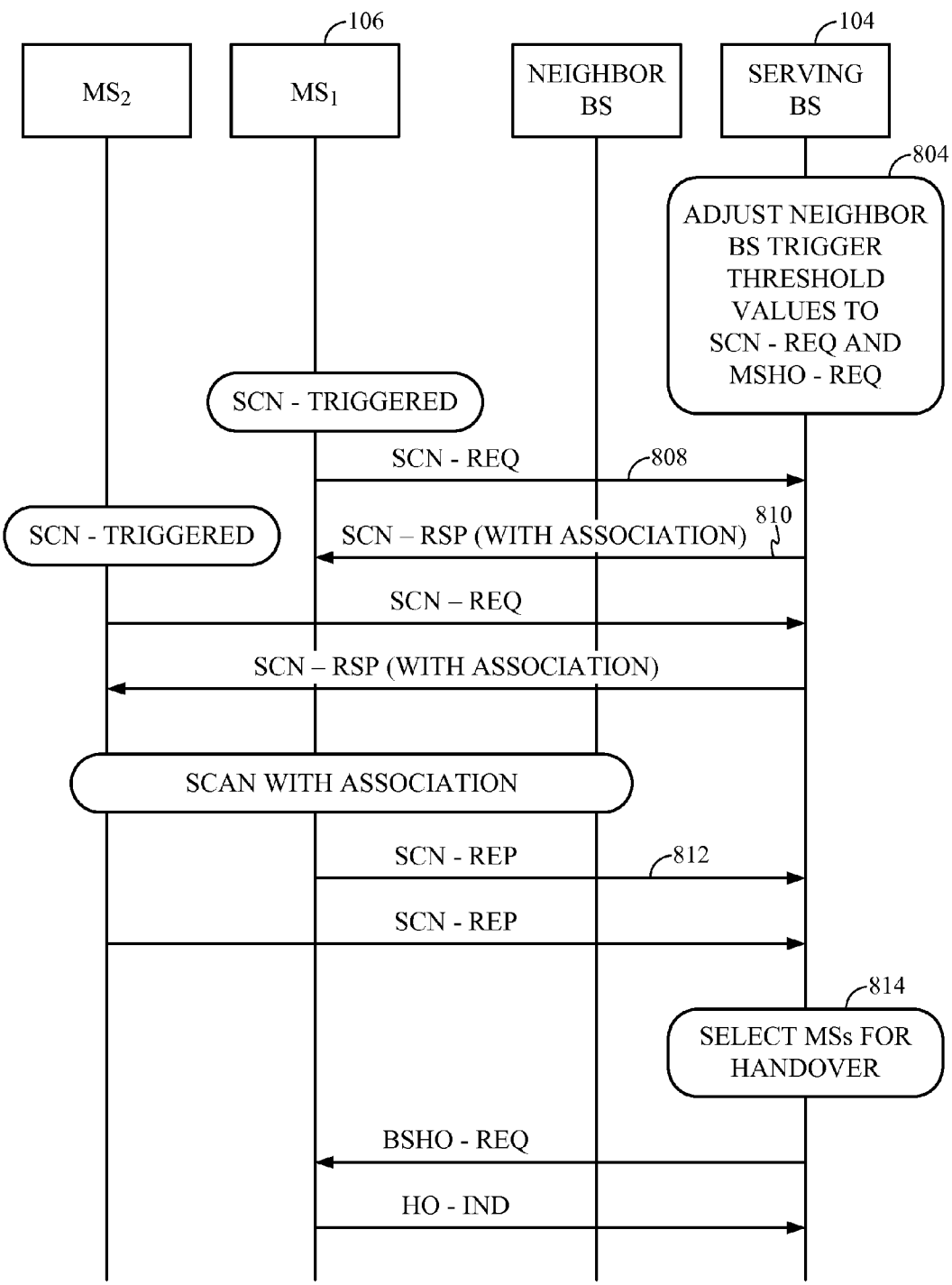
FIG. 8 illustrates example exchange of messages corresponding to the operations illustrated in FIG. 7.

FIG. 8 illustrates example exchange of messages corresponding to the operations illustrated in FIG. 7.

At 804, the serving BS may adjust Scan and Handover Trigger Threshold values based on a calculated load and send these values to $MS_1$ and $MS_2$. The adjusted trigger values may prompt these MSs to respond, at 808, to the trigger threshold values by sending SCN-REQ (Scan Request) messages to the serving BS. At 810, the serving BS may send Scan Response (SCN-RSP) messages to $MS_1$ and $MS_2$. These messages may prompt $MS_1$ and $MS_2$ to scan the neighbor BS and send results of the scan in the form of Scan Reports (SCN-REP), sent at 812.

In the illustrated example, at 814, the serving BS selects $MS_1$ for handover, based on CINR values in the Scan Reports, using any of various suitable techniques as described earlier. Serving BS may then send a Base Station Handover Request (BSHO-REQ) to $MS_1$.

Figure 5A:
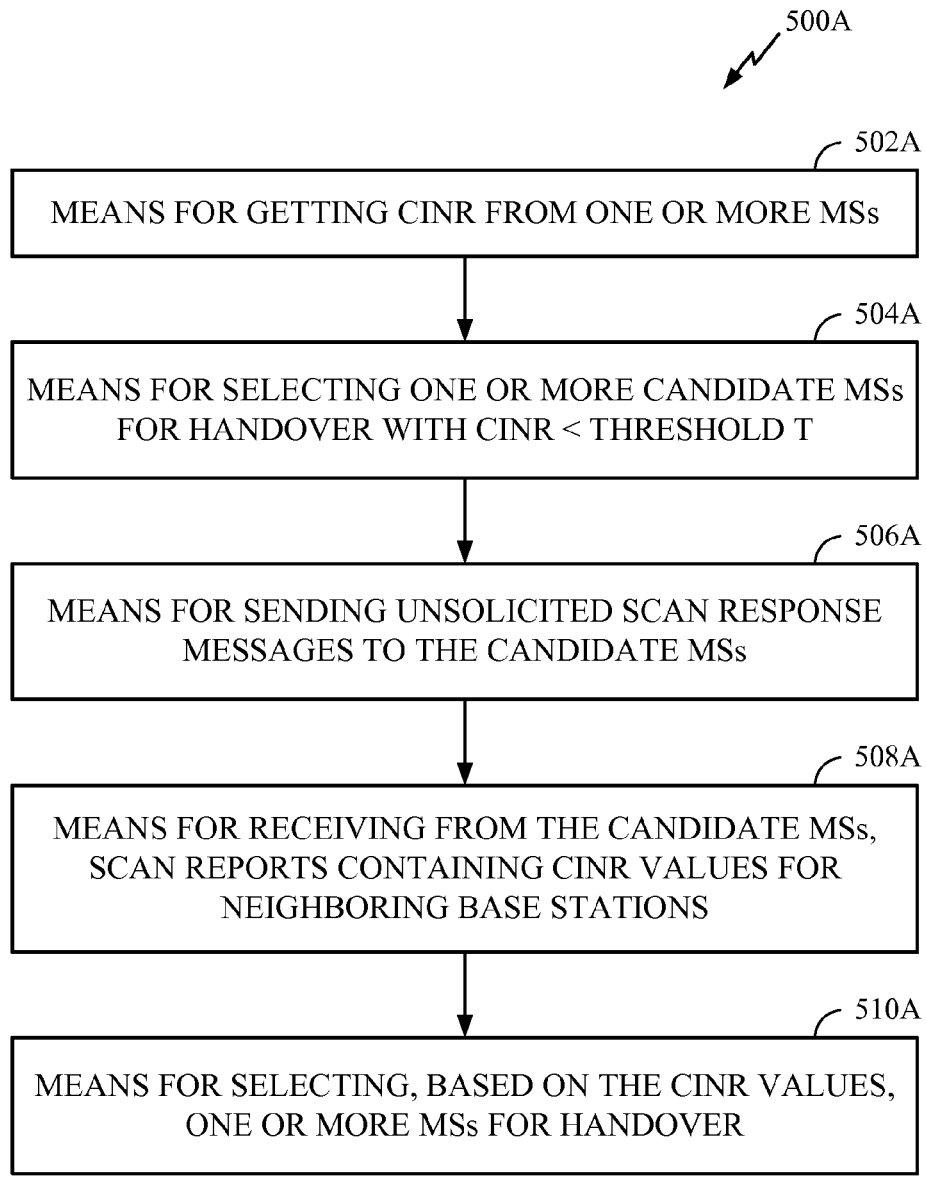
FIG. 5A illustrates example components capable of performing the example operations illustrated in FIG. 5.
Figure 7A:
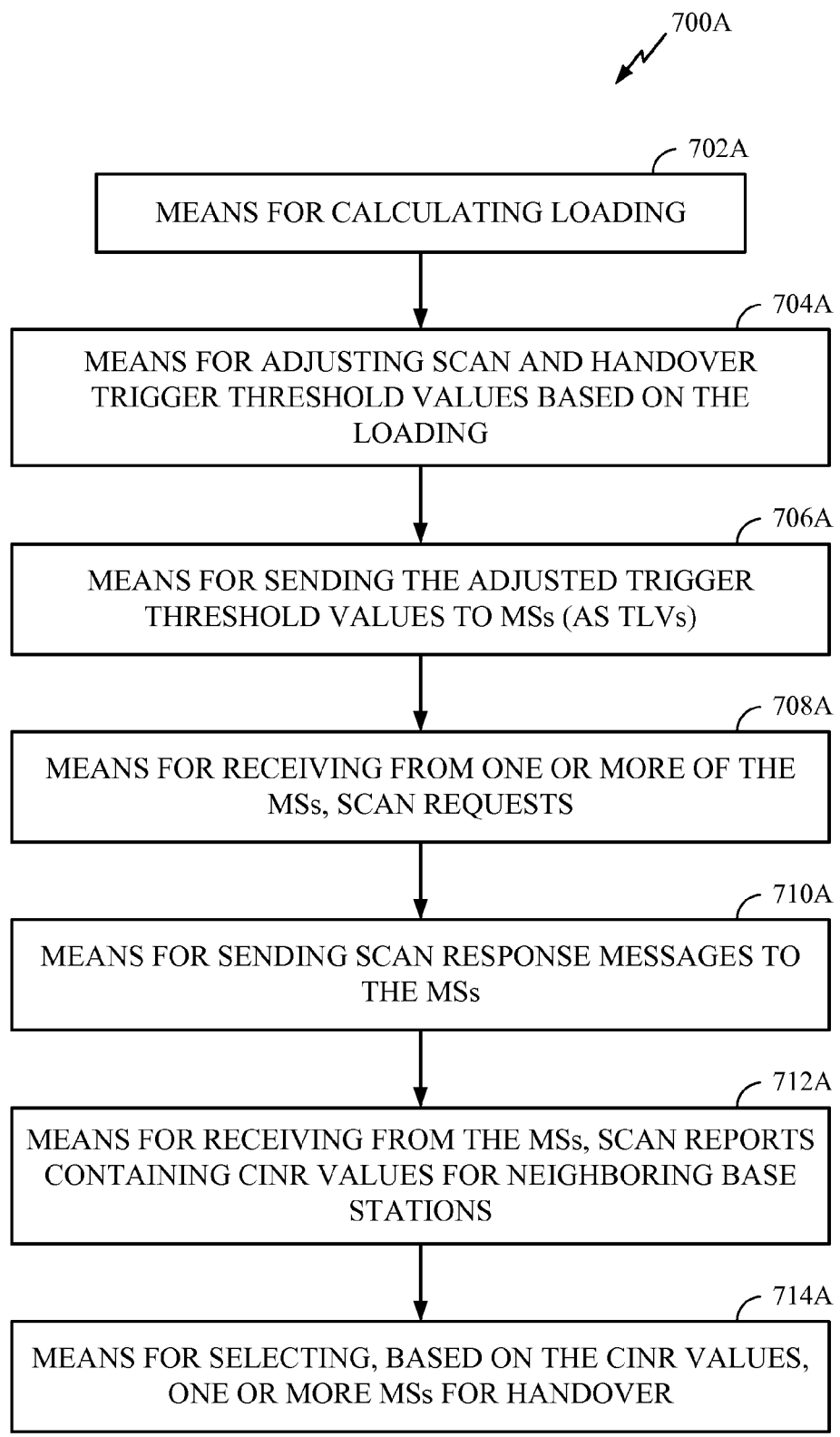
FIG. 7A illustrates example components capable of performing the example operations illustrated in FIG. 7.

The various operations of methods described above may be performed by any suitable means capable of performing the corresponding functions. For example, operations shown in FIGS. 5 and 7 may be performed by corresponding means shown in FIGS. 5A and 7A. The means may include various hardware and/or software component(s) and/or module(s), including, but not limited to a circuit, an application specific integrated circuit (ASIC), or processor.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. In addition, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
   selecting one or more candidate mobile stations (MSs) that are candidates for handover;
   sending unsolicited scan response messages to the candidate MSs;
   receiving scan reports sent in response to the unsolicited scan response messages;
   sorting one or more metrics based on information received in the scan reports; and
   selecting one or more of the candidate MSs for handing over to one of a plurality of neighbor base stations based on information about the neighbor base stations received in the scan reports and based on the sorted metrics.

2. The method of claim 1, wherein candidate selection is triggered based, at least in part, on loading of a base station.

3. The method of claim 1, wherein the candidate MSs selected for handing over are selected randomly.

4. The method of claim 1, wherein the one or more metrics comprises at least one metric indicative of an amount of loading associated with an MS.

5. The method of claim 1, wherein the one or more metrics comprises at least one metric indicative of CINR corresponding to one of the neighbor base stations.

6. The method of claim 1, wherein the candidate MSs are selected based, at least in part, on CINR corresponding to one of the neighbor base stations.

7. A method for wireless communications, comprising:
   determining loading of a serving base station;
   adjusting one or more trigger values indicative of when one or more mobile stations (MSs) performs at least one of scanning or handing over to one of the neighbor base station;
   receiving scan reports from the MSs, prompted by the adjusted trigger values; and
   selecting one or more of the MSs as candidates for handover, based on information in the scan reports.

8. The method of claim 7, wherein adjusting the trigger values comprises:
   decreasing at least one of the trigger values as loading increases.

9. The method of claim 7, wherein adjusting the trigger values comprises:
   increasing at least one of the trigger values as loading increases.

10. An apparatus for wireless communications, comprising:
    at least one processor configured to:
       select one or more candidate mobile stations (MSs) that are candidates for handover;
       send unsolicited scan response messages to the candidate MSs;
       receive scan reports sent in response to the unsolicited scan response messages;
       sort one or more metrics based on information received in the scan reports; and
       select one or more of the candidate MSs for handing over to one of a plurality of neighbor base stations based on information about the neighbor base stations received in the scan reports and based on the sorted metrics; and
    a memory coupled with the at least one processor.

11. An apparatus for wireless communications, comprising:
    at least one processor configured to:
    determine loading of a serving base station;
    adjust one or more trigger values indicative of when one or more mobile stations (MSs) performs at least one of scanning or handing over to a neighbor base station;
    receive scan reports from the MSs, prompted by the adjusted trigger values; and
    select one or more of the MSs as candidates for handover, based on information in the scan reports; and
    a memory coupled with the at least one processor.

12. A non-transitory computer readable medium having a computer program product comprising instructions stored thereon, the instructions executable by one or more processors for:
- selecting one or more candidate mobile stations (MSs) that are candidates for handover;
- sending unsolicited scan response messages to the candidate MSs;
- receiving scan reports sent in response to the unsolicited scan response messages;
- sorting one or more metrics based on information received in the scan reports; and
- selecting one or more of the candidate MSs for handing over to one of a plurality of neighbor base stations based on information about the neighbor base stations received in the scan reports and based on the sorted metrics.

13. A non-transitory computer readable medium having a computer program product comprising instructions stored thereon, the instructions executable by one or more processors for:
- determining loading of a serving base station;
- adjusting one or more trigger values indicative of when one or more mobile stations (MSs) performs at least one of scanning or handing over to a neighbor base station
- receiving scan reports from the MSs, prompted by the adjusted trigger values; and
- selecting one or more of the MSs as candidates for handover, based on information in the scan reports.

14. The apparatus of claim 10, wherein candidate selection is triggered based, at least in part, on loading of a base station.

15. The apparatus of claim 10, wherein the candidate MSs selected for handing over are selected randomly.

16. The apparatus of claim 10, wherein the one or more metrics comprises at least one metric indicative of an amount of loading associated with an MS.

17. The apparatus of claim 10, wherein the one or more metrics comprises at least one metric indicative of CINR corresponding to one of the neighbor base station.

18. The apparatus of claim 10, wherein the candidate MSs are selected based, at least in part, on CINR corresponding to one of the neighbor base stations.

19. The apparatus of claim 11, wherein adjusting the trigger values comprises:
- decreasing at least one of the trigger values as loading increases.

20. The apparatus of claim 11, wherein adjusting the trigger values comprises:
- increasing at least one of the trigger values as loading increases.

* * * * *